US012509327B2

(12) United States Patent
Perunka et al.

(10) Patent No.: US 12,509,327 B2
(45) Date of Patent: Dec. 30, 2025

(54) ENERGY STORAGE SYSTEM FOR AN ELEVATOR CAR, AND A METHOD AND AN APPARATUS FOR MONITORING THE ENERGY STORAGE SYSTEM

(71) Applicant: KONE Corporation, Helsinki (FI)

(72) Inventors: Pekka Perunka, Helsinki (FI); Mikko Puranen, Helsinki (FI); Janne Öfversten, Helsinki (FI); Ville Thomenius, Helsinki (FI); Jari Romo, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1717 days.

(21) Appl. No.: 16/795,120

(22) Filed: Feb. 19, 2020

(65) Prior Publication Data

US 2020/0283264 A1 Sep. 10, 2020

(30) Foreign Application Priority Data

Mar. 7, 2019 (EP) .................................... 19161332

(51) Int. Cl.

| | |
|---|---|
| ***B66B 5/00*** | (2006.01) |
| ***B66B 1/30*** | (2006.01) |
| ***B66B 1/34*** | (2006.01) |
| ***B66B 3/00*** | (2006.01) |
| ***B66B 5/02*** | (2006.01) |

(52) U.S. Cl.

CPC ............ *B66B 5/0025* (2013.01); *B66B 1/302* (2013.01); *B66B 1/306* (2013.01); *B66B 1/3461* (2013.01);

(Continued)

(58) Field of Classification Search

CPC ......... B66B 1/34; B66B 1/302; B66B 5/0031; B66B 1/06; B66B 1/308; B66B 5/0018;

(Continued)

(56) References Cited

U.S. PATENT DOCUMENTS

| | | | | |
|---|---|---|---|---|
| 9,837,860 | B2 * | 12/2017 | McCarthy ............... | H02J 50/80 |
| 2001/0017237 | A1 * | 8/2001 | Tominaga ............... | H02P 23/06 187/290 |

(Continued)

FOREIGN PATENT DOCUMENTS

| | | | |
|---|---|---|---|
| CN | 102910505 A | * | 2/2013 |
| CN | 106185500 A | | 12/2016 |

(Continued)

*Primary Examiner* — Jeffrey Donels

(74) *Attorney, Agent, or Firm* — Birch, Stewart, Kolasch & Birch, LLP

(57) ABSTRACT

According to an aspect, there is provided an energy storage system for an elevator car of an elevator system, comprising an energy storage; an energy storage management system connected to the energy storage and configured to monitor a state of the energy storage. The energy storage management system is configured to communicate directly with a charging arrangement located in an elevator shaft via a first communication channel to start and stop charging of the energy storage via the charging arrangement. The energy storage management system is further configured to communicate with an elevator controller associated with the elevator car via a second communication channel.

20 Claims, 4 Drawing Sheets

(52) U.S. Cl.
CPC .............. *B66B 3/00* (2013.01); *B66B 5/0031* (2013.01); *B66B 5/02* (2013.01); *B66B 3/002* (2013.01)

(58) Field of Classification Search
CPC ... B66B 2201/00; B66B 3/002; B66B 1/3492; B66B 2201/211; B66B 1/00; B66B 1/3446; B66B 2201/216; B66B 2201/213; B66B 11/02; B66B 17/00; B66B 2201/215; B66B 5/10; B66B 1/36
See application file for complete search history.

(56) References Cited

U.S. PATENT DOCUMENTS

2017/0057789 A1* 3/2017 Witczak .............. B66B 11/0273
2018/0134519 A1* 5/2018 Kattainen ................. B66B 1/32
2020/0148507 A1* 5/2020 Sirigu ................... B66B 5/0025
2020/0283264 A1* 9/2020 Perunka .................... B66B 5/02

FOREIGN PATENT DOCUMENTS

| | | | | | |
|---|---|---|---|---|---|
| CN | 109132798 | A | | 1/2019 | |
| EP | 3153442 | A1 | * | 4/2017 | ........... B66B 5/0025 |
| EP | 3403966 | A1 | * | 11/2018 | ............... B66B 1/30 |
| EP | 3502028 | A1 | * | 6/2019 | ............... B66B 1/30 |
| EP | 3705434 | A1 | * | 9/2020 | ............... B66B 1/18 |
| EP | 3705436 | A1 | * | 9/2020 | ............... B66B 1/28 |
| JP | 2001240322 | A | * | 9/2001 | ............... B66B 1/30 |
| KR | 20220044672 | A | * | 4/2022 | |
| WO | WO-2010059139 | A1 | * | 5/2010 | ............. B66B 1/302 |
| WO | WO-2013057750 | A1 | * | 4/2013 | ............. B66B 1/302 |
| WO | WO-2014010051 | A1 | * | 1/2014 | ............. B66B 1/302 |

* cited by examiner

ENERGY STORAGE SYSTEM FOR AN ELEVATOR CAR, AND A METHOD AND AN APPARATUS FOR MONITORING THE ENERGY STORAGE SYSTEM

BACKGROUND

Travelling cable free elevator cars need to have an on-board energy storage for providing power to an elevator car. These energy storages have a limited storage capacity and thus it is necessary to recharge them on intervals sufficient. Lack of charge in the energy storage system could at worst result in loss of power supply to the car electrification, which in the case of wirelessly operating elevator car could cause an emergency stop.

The on-board battery system that supplies power to the car electrification is a safety critical subsystem, where a malfunction may create a serious hazard. Additionally, the limited amount of energy stored within the elevator on-board energy storage system means that it is necessary to recharge the energy storage on intervals sufficient to keep the state of the energy storage system at an optimal level. Short charging times during elevator stop times at charging stations require fast charging capability up to, for example, tens of kilowatts. Safety is a critical issue when transferring energy at a high-power level to the on-board battery system. The charging should therefore be enabled only under conditions that are recognized as safe.

Therefore, there is a need for a solution that would enable safe charging of the on-board battery system of an elevator car.

SUMMARY

According to a first aspect, there is provided an energy storage system for an elevator car of an elevator system. The energy storage system comprises an energy storage; an energy storage management system connected to the energy storage and configured to monitor a state of the energy storage; wherein the energy storage management system is configured to communicate directly with a charging arrangement located in an elevator shaft via a first communication channel to start and stop charging of the energy storage via the charging arrangement. The energy storage management system is further configured to communicate with an elevator controller associated with the elevator car via a second communication channel.

In an embodiment, the first communication channel is a first wireless communication channel and the second communication channel is a second wireless communication channel.

In an embodiment, alternatively or additionally, the energy storage management system is configured to detect an anomaly in the operation of the energy storage; and command the charging arrangement to stop charging of the energy storage.

In an embodiment, alternatively or additionally, the energy storage management system is configured to receive, from the elevator controller, a command to start charging of the energy storage; and send a command to the charging arrangement to start charging of the energy storage.

In an embodiment, alternatively or additionally, the energy storage management system is configured to receive, from the elevator controller, a command to stop charging of the energy storage; and send a command to the charging arrangement to stop charging of the energy storage.

In an embodiment, alternatively or additionally, the energy storage management system is configured to receive a full charging command from the elevator controller; and perform a maintenance charging of the energy storage to balance the energy storage.

In an embodiment, alternatively or additionally, the energy storage management system is configured to receive an out-of-service signal from the elevator controller; and disable the charging of the energy storage.

In an embodiment, alternatively or additionally, the energy storage management system is configured to generate a warning signal in response to the monitoring the state of the energy storage; and send the warning signal to the elevator controller.

In an embodiment, alternatively or additionally, the energy storage management system is configured to determine that a charge level of the energy storage is below a first threshold; and generate the warning signal in response to determining that the charge level is below the first threshold.

In an embodiment, alternatively or additionally, the energy storage management system is configured to generate a fault signal in response to the monitoring the state of the energy storage; and send the fault signal to the elevator controller.

In an embodiment, alternatively or additionally, the energy storage management system is configured to determine that a charge level of the energy storage is below a second threshold; and generate the fault signal in response to determining that the charge level is below the second threshold.

In an embodiment, alternatively or additionally, the energy storage management system is configured to send targeted current and/or voltage levels for the charging arrangement via the first communication channel.

According to a second aspect, there is provided a method for monitoring an energy storage system of an elevator car. The method comprises receiving, from an energy storage management system configured to monitor a state of the energy storage of the elevator car, a signal indicating a state associated with the energy storage system; determining an operating state of the elevator car; determining an action for the elevator car based on the state associated with the energy storage system and the operating state of the elevator car; and controlling the elevator car to perform the action.

In an embodiment, the method further comprises receiving, from the energy storage management system, a signal indicating that charging of the energy storage is disabled and charging contacts are de-energized; and closing a safety circuit associated with the elevator car.

In an embodiment, the method further comprises receiving, from the energy storage management system, a signal indicating that charging of the energy storage is enabled and charging contacts are energized; and opening a safety circuit associated with the elevator car.

In an embodiment, determining an action for the elevator car based on the state associated with the energy storage system and the operating state of the elevator car comprises: determining, based a data structure comprising different elevator car operation state variables and states of the energy storage, the action for the elevator car.

In an embodiment, alternatively or additionally, the action comprises one of the following: make an immediate emergency stop; drive to the nearest floor and stop there; drive to a charging floor and stop there; serve the present active call and stop at the charging floor; serve all existing calls and stop at the charging floor; and continue a normal operation until next maintenance.

According to a third aspect, there is provided an elevator system comprising an elevator car, an elevator controller associated with the elevator car; and an energy storage system of the first aspect for the elevator car.

According to a fourth aspect, there is provided an apparatus for monitoring an energy storage system of an elevator car. The apparatus comprises means for receiving, from an energy storage management system configured to monitor a state of the energy storage of the elevator car, a signal indicating a state associated with the energy storage system; means for determining an operating state of the elevator car; means for determining an action for the elevator car based on the state associated with the energy storage system and the operating state of the elevator car; and means for controlling the elevator car to perform the action.

According to a fifth aspect, there is provided a computer program comprising program code, which when executed by at least one processing unit, causes the at least one processing unit to perform the method of the second aspect.

According to a sixth aspect, there is provided a computer readable medium comprising program code, which when executed by at least one processor, causes the at least one processor to perform the method of any the second aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution for enabling an implementation in which charging of an elevator car energy storage is enabled only under conditions that are recognized as safe and possible failure modes can be either eliminated or mitigated to the minimum.

Figure 1:
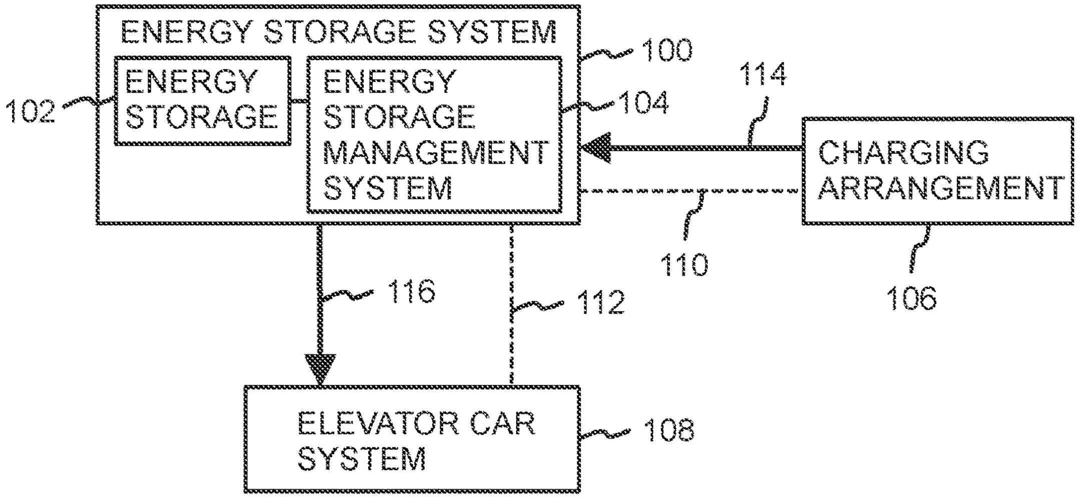
FIG. 1 illustrates a block diagram of an energy storage system and its interfaces to associated systems according to an embodiment.

FIG. 1 illustrates a block diagram of an energy storage system 100 and its interfaces to associated systems according to an embodiment.

An energy storage system 100 in an elevator car supplies operating power for various equipment in an elevator car, for example, instrument panel, lighting, air conditioning, emergency lights, door operator, safety devices etc. The energy storage system 100 may comprise an energy storage 102 and an energy storage management system 104 monitor a state of the energy storage 102. The term "energy storage" used herein refers to a component or a system that is able to store electricity and supply it to the elevator car system 108. The energy storage 102 may comprise a battery or batteries, for example, a high-capacity lithium-ion battery.

As the energy storage 102 has a limited capacity, it needs to be charged at regular intervals. The energy storage 102 is configured to be charged from a charging arrangement 106 located in an elevator shaft in which the elevator car travels. The charging itself may be implemented as a wireless charging solution or with a contact-based charging solution. The energy storage system 100 may comprise a charging collector configured to enable charging of the elevator storage 102. The energy storage management system 104 is configured to communicate directly with the charging arrangement 106 via a first communication channel 110 to start and stop charging of the energy storage 102 via the charging arrangement 106, for example, via a wireless controller area network (CAN) bridge. In an embodiment, the first communication channel 110 may be a wireless communication channel. In another embodiment the first communication channel 110 may be implemented using a physical media.

The first communication channel 110 may be implemented using any technology enabling wireless data communication. In practice, the charging arrangement 106 may provide a direct current (DC) input 114 for the energy storage 102. Before supplying operating power 116 to the elevator car system 108, the energy storage system 100 may perform a direct current-alternating current (DC-AC) conversion. The energy storage system 100 may also enable diagnostics and data logging via the CAN bus. Further, in an embodiment, the energy storage management system 104 may be configured to send targeted current and/or voltage levels for the charging arrangement 106 via the first communication channel.

The energy storage system 100 is configured to communicate with the elevator car system 108 (for example, with an elevator controller) via a second communication channel 112, for example, via wirelessly transmitted digital input/output (DI/O) signals. The elevator controller may be arranged, for example, in the elevator shaft or in a landing to machine room. In an embodiment, the second communication channel 112 is a second wireless communication channel.

The solution illustrated in FIG. 1 enables fast fault response compared, for example, to a system where communication with the charger arrangement would happen via the elevator controller.

Figure 2:
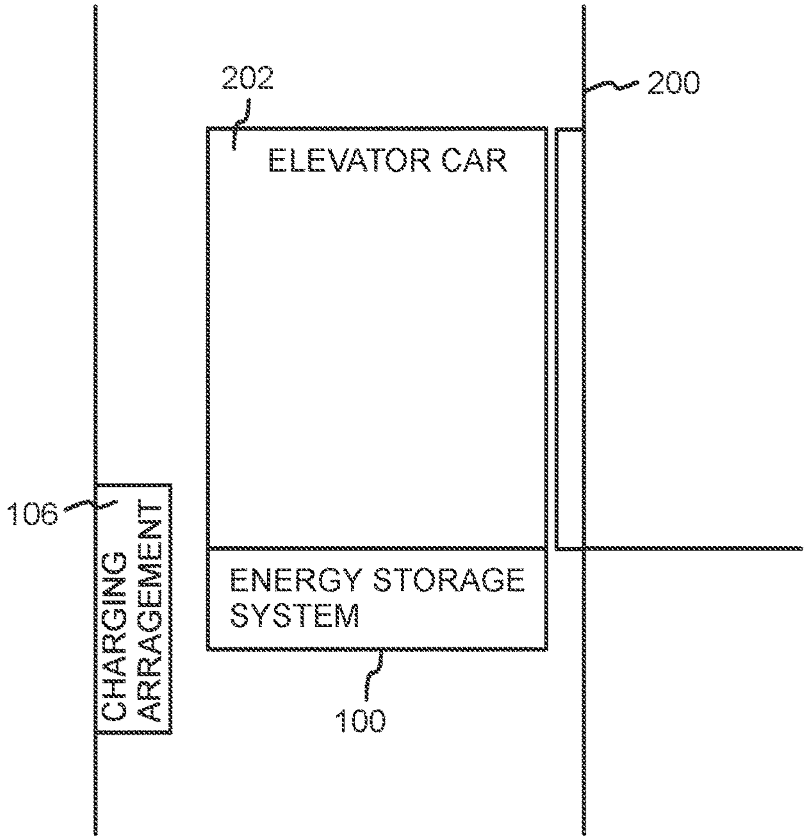
FIG. 2 illustrates a block diagram of an elevator system according to an embodiment.

FIG. 2 illustrates a simplified block diagram of an elevator system according to an embodiment. The elevator system comprises an elevator car 202 configured to travel in an elevator shaft 200. There are no travelling cables associated with the elevator car 200 providing operating power to various equipment in the elevator car. Instead, an energy storage system 100 comprising an energy storage has been included into the elevator car 202. The energy storage can be charged using a charging arrangement 106 positioned at one or more locations within the elevator shaft 200. The elevator shaft 200 may comprise a primary part of the charging arrangement and the elevator car may comprise a secondary part of the charging arrangement. The charging may be implemented, for example, as wireless charging or as a contact-based solution while an elevator car is stationary at a floor provided with the charging arrangement.

Figure 3:
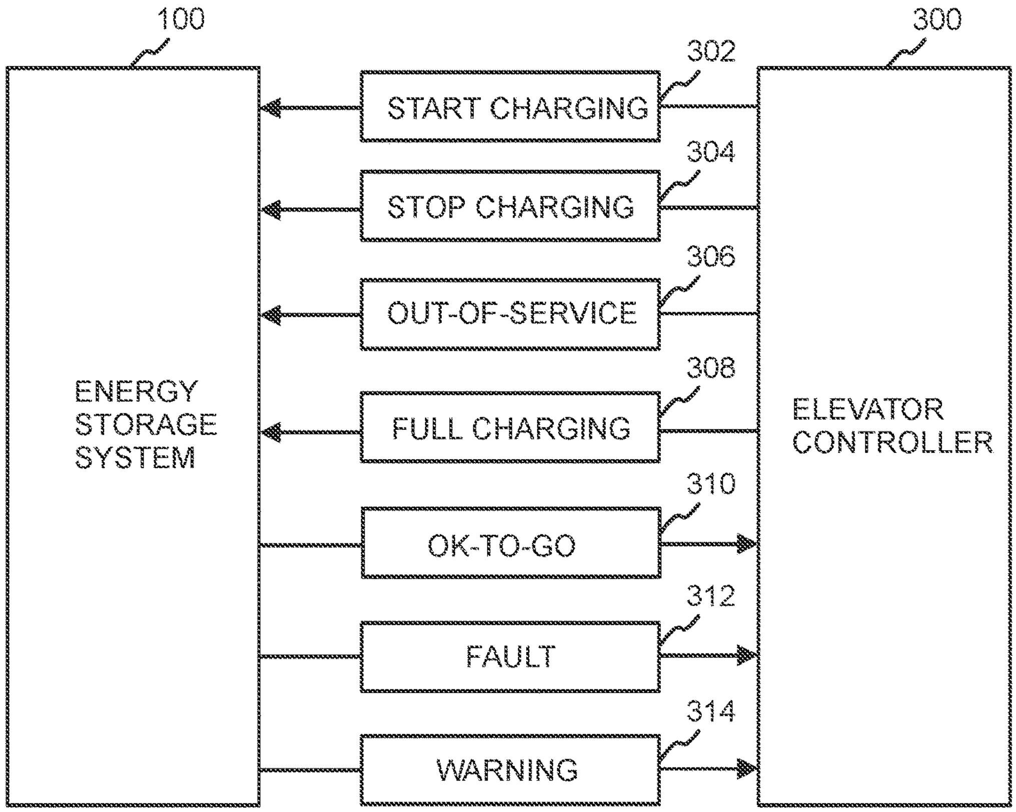
FIG. 3 illustrates a flow diagram illustrating possible communication signals between an energy storage system and an elevator controller according to another embodiment.

FIG. 3 illustrates a flow diagram illustrating possible communication signals between an energy storage system 100 and an elevator controller 300 according to an embodiment. The elevator controller 300 may be arranged, for example, in a machine room.

The elevator controller 300 starts the charging sequence by dispatching a START CHARGING signal 302 to the energy storage system 100. The START CHARGING signal 302 may be sent only under conditions in which the elevator is stopped at a charging level and a maintenance mode has not been activated. Charging of the energy storage system 100 is also stopped when the energy storage system 100 receives a STOP CHARGING signal 304 from the elevator controller 300. This may happen if a call exists or if the maintenance mode has been activated. An OUT OF SERVICE signal 306 may be sent to the energy storage system 100 causing disabling of the charging in order to make sure, for example, that maintenance personnel can carry out their work under safe conditions. This effectively de-energizes any contacts that might expose technicians to live electric parts. A FULL CHARGING signal 308 may be sent to the energy storage system 100 to instruct the energy storage system 100 to start a maintenance charging to balance cells of the energy storage. This can be performed, for example, once per day. In another embodiment, the direction of the FULL CHARGING signal 308 may be reversed. In other words, the energy storage system 100 may inform the elevator controller 300 if a cell imbalance of the energy storage has deviated outside of a certain threshold value and a cell balancing operation needs to be performed. On-board energy storages that utilize battery technology (for example, configurations of individual battery cells connected in series and parallel) have an inherent problem with imbalance between individual cell voltages due to the difference in cell resistance over the entire battery pack. This means that at some point the battery pack has to be balanced after the cell voltages have deviated too far from each other. A severe cell imbalance will reduce the utilizable capacity of the battery pack and in worst case lead to a risk of overcharging or over-discharging.

FIG. 3 also illustrates three exemplary signals that can be sent the elevator controller 300 from the energy storage system 100. An OK-TO-GO signal 310 serves to inform the elevator controller 300 that after the STOP CHARGING signal 304 the charging has actually been disabled and the charging contacts are deenergized so that elevator can safely take off from landing.

An error or fault state of the energy storage may also be indicated to the elevator controller 300 by using a FAULT signal 312 or a WARNING signal 314. The FAULT signal may refer to critical faults in the energy storage system 100 that require the elevator to return to a charging floor immediately. The WARNING signal 314 may refer to non-critical faults that allow the elevator to continue to serve all the existing calls before returning to the charging floor to wait for a maintenance check.

Figure 4:
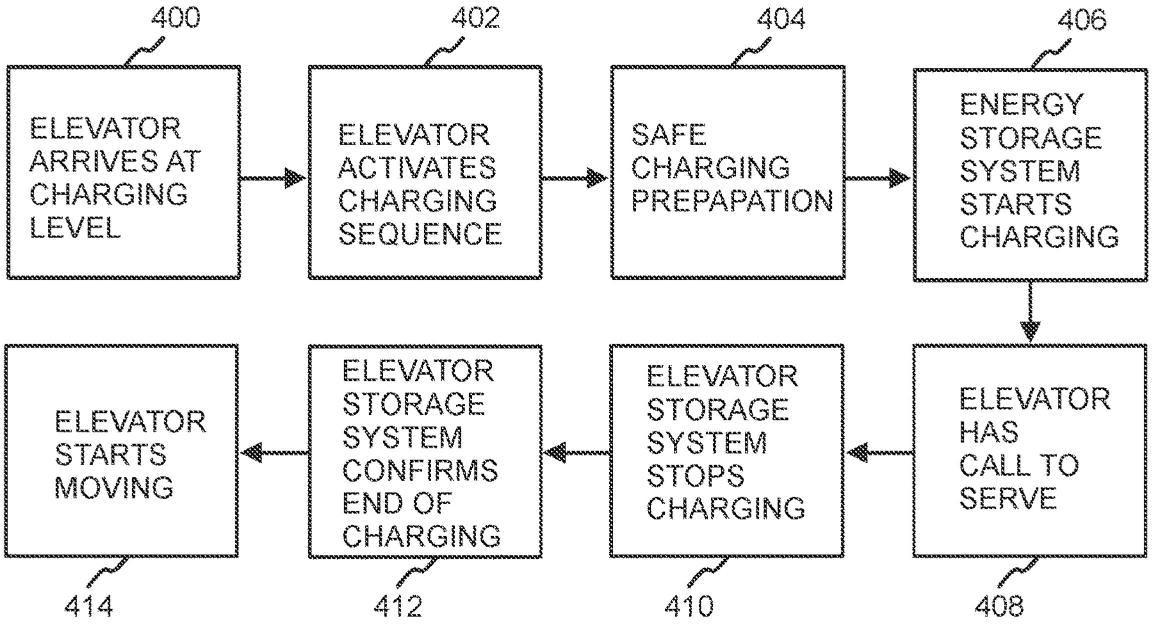
FIG. 4 illustrates an exemplary charging sequence of an energy system according to an embodiment.

FIG. 4 illustrates an exemplary charging sequence of an energy system according to an embodiment. The charging sequence shows in a chronological order the sequence in which an elevator, an energy storage and a charger configured to charge the energy storage communicate with each other during charging.

At 400 the elevator arrives at a charging level. The charging level may be in one or more floors of a building. At the charging level a charging collector at the elevator side docks to a charging connector arranged at a shaft side.

At 402 the elevator activates the charging sequence. The elevator may identify the elevator car position and sends a START CHARGING signal to the energy storage system if the elevator has stopped at the charging level and is in a normal operation state.

At 404 the energy storage system ensures that it is safe to start charging of the energy storage. For example, the energy storage system may disable the OK-TO-GO signal, i.e. when the charging is enabled. The elevator car movement is then prevented when the charging is enabled. A safety circuit may also be opened to prevent elevator car movements during the charging.

At 406 the energy storage system starts the charging. The energy storage system may control the charger to initiate the charging and transmit charging current values.

At 408 the elevator has received a call which it has to serve. The elevator may send the STOP CHARGING signal to the elevator storage system and it may then begin a start sequence.

At 410 the energy storage system stops charging of the energy storage. The energy storage system may control the charger via the first communication channel to terminate charging.

At 412 the energy storage system confirms a termination of the charging to the elevator. The termination means that the charging connection has been de-energized, and the energy storage system enables the OK-TO-GO signal to the elevator.

At 414 the elevator starts moving. Before moving the elevator has closed the safety circuit to enable the movement again.

When bi-directional communication is enabled in the elevator/energy storage system interface and when coupling the charging to the safety circuit, this guarantees that charging can be performed safely.

Figure 5:
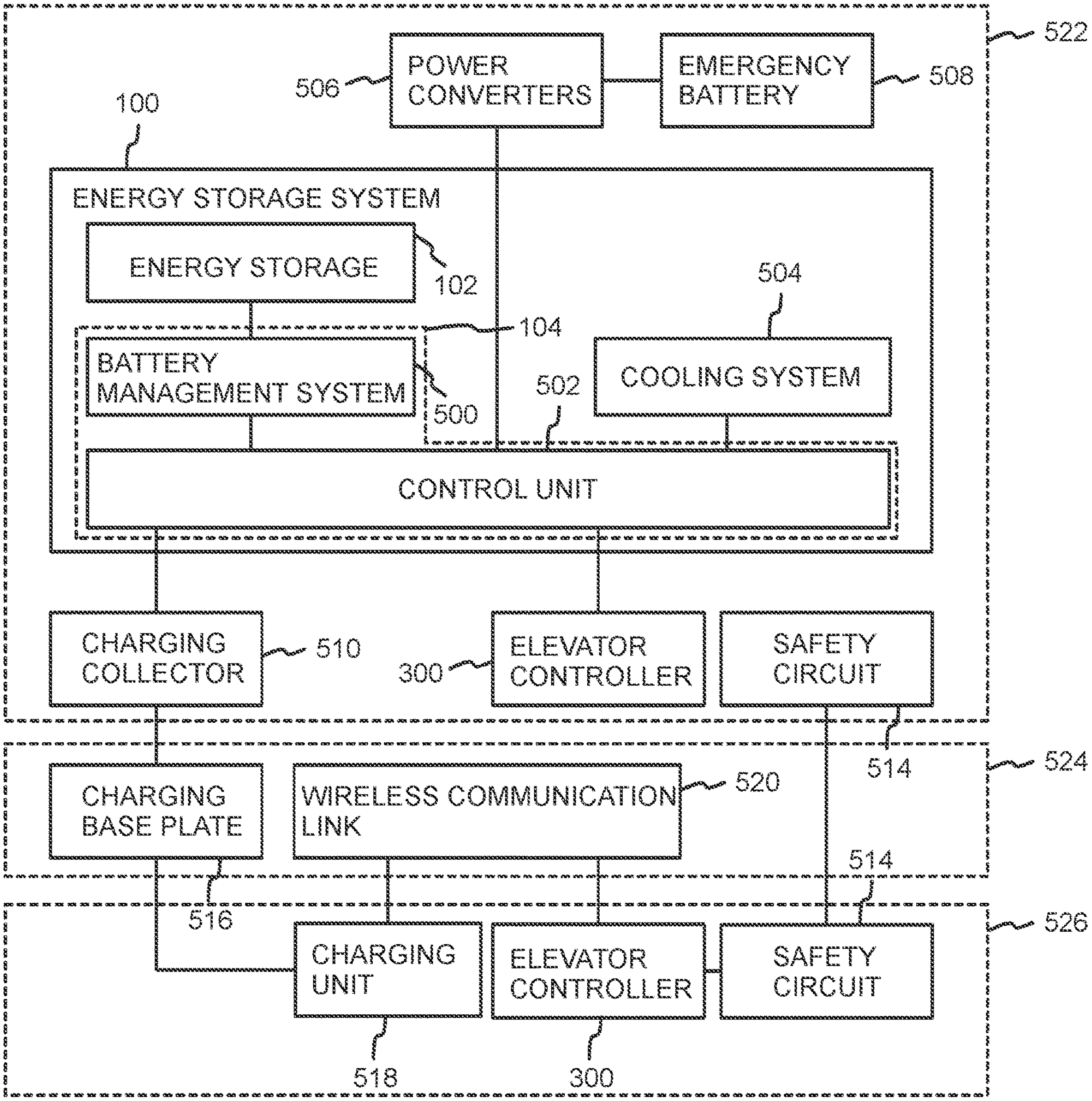
FIG. 5 illustrates an exemplary communication architecture according to an embodiment.

FIG. 5 illustrates an exemplary communication architecture according to an embodiment. The communication architecture enables a fault indication and a response method for an elevator with on-board energy storage system. The communication architecture may comprise the following elements:

1) A machine room 526
2) An elevator shaft 524
3) An elevator car 522
4) An energy storage System 100
5) An energy storage 102
6) An energy storage management system 104
7) A cooling system 504
8) Power converters 506
9) An emergency battery 508
10) A charging collector 510
11) An elevator controller 300
12) A safety circuit 514
13) A charging base plate 516
14) A wireless communication link 520
15) A charging unit 518

The energy storage management system 104 may comprise a battery management system 500 and a control unit 502. In another embodiment, a single unit may comprise the energy storage management system 104 and the battery management system 500. The control unit 502 may execute the main decision logic for identifying and/or categorizing fault and/or error states within the energy storage system 100, the charging unit 518, the cooling system 504, the power converters 506, the emergency battery 508, the charging collector 510 and charging base plate 516 into critical (FAULT) and non-critical (WARNING) states. The energy storage management system may also be equipped with additional monitoring devices for fault finding, for example, voltage, current, temperature, pressure, position, speed and/or moisture measurement equipment. After identification and categorization, the control unit 502 communicates these states to the elevator by dispatching WARNING or/and FAULT signals to the elevator controller 300.

The control unit 502 may have been parametrized to consider different subsystem fault/error states as either critical or non-critical states. For example, when a state of charge (SOC) of the energy storage 102 monitored by the battery management system 500 falls below a pre-specified threshold level, for example, 20%, the control unit 502 may recognize this as a non-critical fault state and dispatches the WARNING signal to the elevator controller 300. If the state of charge keeps falling even further, for example, below 5%, the control unit may recognize this as a critical fault state and dispatch the FAULT signal to the elevator controller 300. The FAULT signal may indicate a safety critical fault state and the WARNING signal may indicate a non-safety critical fault state.

Table 1 shows some exemplary possible actions for WARNING and FAULT signals when the elevator is in a specific state.

TABLE 1

| | Warning | Fault |
|---|---|---|
| Running (active calls) | Serve the active calls and return to the charging level | Run to the nearest level and stop |
| Running (no active calls) | Run to the charging level and stop | Run to the charging level and stop |
| Stopped at a charging floor | Serve the active call and stop at the charting level | Immediate emergency stop |
| Stopped at a non-charging floor | Run to the nearest level and stop | Run to the nearest level and stop |
| Out of service | Continue normal operation until next maintenance | Continue normal operation until next maintenance |

The elevator controller 300 may respond to the received fault state signal (WARNING/FAULT) according to its own pre-configured decision logic. The response may be, for example, one of the following:

1. An immediate emergency stop
2. Run to the nearest level and stop
3. Run to the charging level and stop
4. Serve the active call and stop at charging the level
5. Serve all existing calls and stop at the charging level
6. Continue normal operation until next maintenance Depending on the severity of the event, which is a combination of the status of the elevator (running, stopped, maintenance etc.) and the fault state indicated by the control unit 502 (critical or non-critical), the elevator controller 300 may choose an appropriate response among the above six options. Furthermore, the fault state information may also be stored into a service log that can be accessed locally or via a cloud communication interface via the wireless communication link 520.

Figure 6:
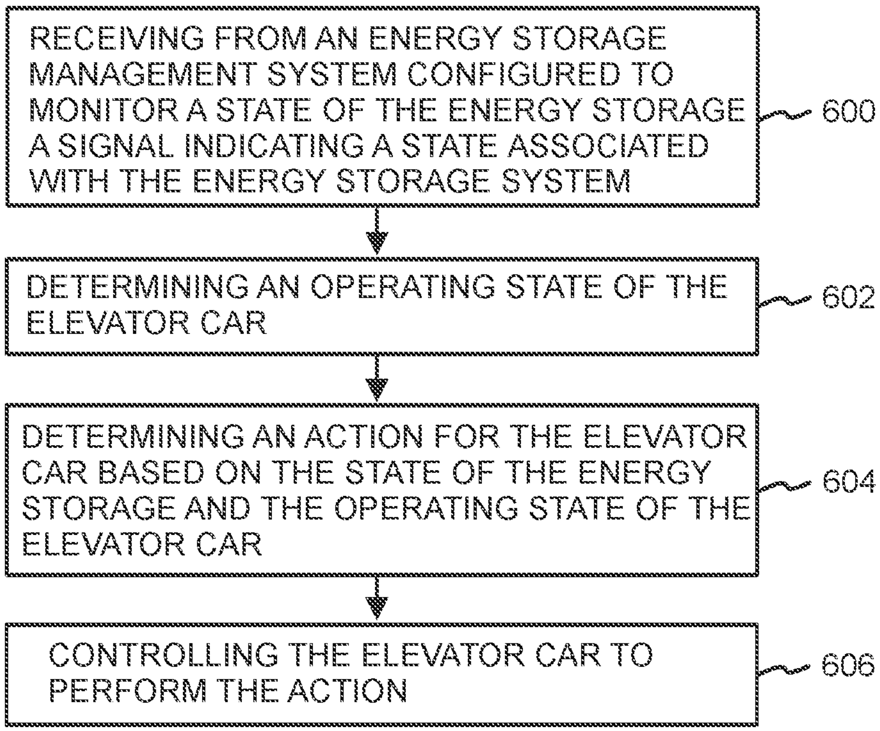
FIG. 6 illustrates a flow diagram of a method for monitoring an energy storage of an elevator car according to an embodiment.

FIG. 6 illustrates a flow diagram of a method for monitoring an energy storage of an elevator car according to an embodiment.

At 600 a signal indicating a state associated with the energy storage system 100 is received from the energy storage management system 104 configured to monitor a state of the energy storage 102 of the elevator car 202. The signal may be received via a wireless communication channel.

At 602 an operating state of the elevator car 202 is determined.

At 604 an action for the elevator car 202 is determined based on the state associated with the energy storage system 100 and the operating state of the elevator car 202.

At 606 the elevator car 202 is controlled to perform the action.

In one embodiment, a signal indicating that charging is disabled and charging contacts are de-energized may be received from the energy storage management system 104. In response to this signal, a safety circuit associated with the elevator car 202 may be closed in order to enable movement of the elevator car.

In one embodiment, determining an action for the elevator car 202 based on the state associated with the energy storage system 100 and the operating state of the elevator car 202 comprises determining, based a data structure comprising different elevator car operation state variables and states of the energy storage 102, the action for the elevator car 202. As an example, the action may comprise one of the following: make an immediate emergency stop, drive to the nearest floor and stop there, drive to a charging floor and stop there, serve the present active call and stop at the charging floor, serve all existing calls and stop at the charging floor, and continue a normal operation until next maintenance.

Figure 7:
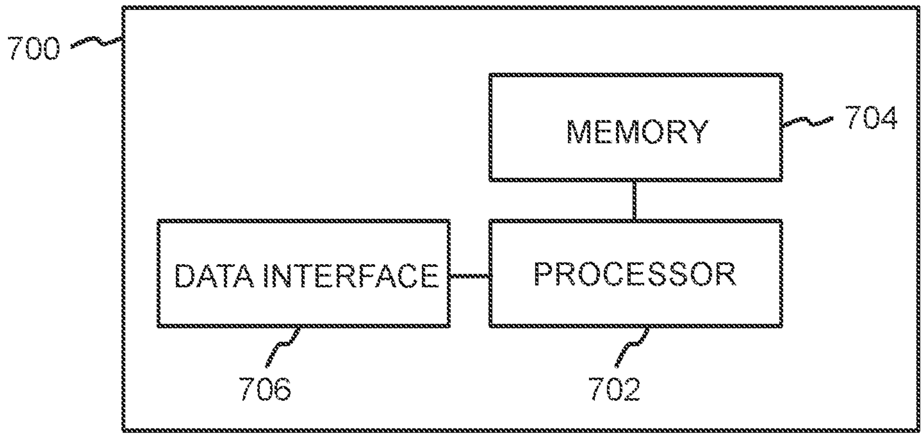
FIG. 7 illustrates a block diagram of an apparatus for monitoring an energy storage system of an elevator car according to an embodiment.

FIG. 7 illustrates a block diagram of an apparatus 700 for monitoring an energy storage system 100 of an elevator car 202 according to an embodiment. In an embodiment, the apparatus 700 may comprises an elevator controller. In an embodiment, the apparatus 700 may be implemented as a computer.

The illustrated apparatus 700 can include a controller or processor 702 (e.g., signal processor, microprocessor, ASIC, or other control and processing logic circuitry) for performing such tasks as signal coding, data processing, input/output processing, power control, and/or other functions. The illustrated apparatus 700 can include a memory or memories 704. The memory 704 can include non-removable memory and/or removable memory. The non-removable memory can include RAM, ROM, flash memory, a hard disk, or other well-known memory storage technologies. The memory 704 may also be used for storing data and/or code for running one or more applications.

The apparatus 700 may further comprise a data interface 706 that enabling communication with external devices or networks, for example, the energy storage system 100. The data interface 706 may include a wired or wireless transceiver for communicating with the external devices or networks. The components of the apparatus 700 are exemplary, and the apparatus 700 may comprise also other components or elements.

The memory 704 may comprise a computer program that, when executed by the processor 572, causes the apparatus 700 to receive, from the energy storage management system configured to monitor a state of the energy storage 102, a signal indicating a state associated with the energy storage system 100; determine an operating state of the elevator car; determine an action for the elevator car based on the state associated with the energy storage system and the operating state of the elevator car; and control the elevator car 202 to perform the action.

Further, any combination of the illustrated components disclosed in FIG. 7, for example, at least one of the processor 702, the memory 704 and the data interface 706 may constitute means for receiving, from the energy storage management system 104 configured to monitor a state of the energy storage 102, a signal indicating a state associated with the energy storage system 100; means for determining an operating state of the elevator car; means for determining an action for the elevator car based on the state associated with the energy storage system and the operating state of the elevator car; and means for controlling the elevator car to perform the action.

The illustrated examples and embodiments may provide at least of the following advantages:

An improved charging safety due to the bilateral communication between elevator and battery during charging.

Charging is enabled only when elevator is at the charging floor and it's fully stopped.

The elevator car movement is prevented during charging.

Improved safety for maintenance personnel due to the disabling of the charging during a maintenance mode.

The elevator system can react to battery system warning and fault conditions.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An energy storage system for an elevator car of an elevator system, comprising:

an energy storage mounted to the elevator car;

an energy storage management system mounted to the elevator car and connected to the energy storage and configured to monitor a state of the energy storage;

wherein the energy storage management system is configured to communicate directly with a charging arrangement located in an elevator shaft via a first communication channel to start and stop charging of the energy storage via the charging arrangement, the first communication channel being a wireless controller area network bridge;

wherein the energy storage management system is further configured to communicate with an elevator controller associated with the elevator car via a second communication channel, the second communication channel bypassing the charging arrangement; and wherein the energy storage management system transmits the state of the energy storage to the elevator controller via the second communication channel and, responsive to the transmission of the state of the energy storage, receiving a command from the elevator controller via the second communication channel for the elevator car to perform one of the following actions:

make an immediate emergency stop;

drive to the nearest floor and stop there;

drive to a charging floor and stop there;

serve the present active call and stop at the charging floor;

serve all existing calls and stop at the charging floor;

continue a normal operation until next maintenance.

2. The energy storage system of claim 1, wherein the energy storage management system is configured to:

detect an anomaly in the operation of the energy storage; and command the charging arrangement to stop charging of the energy storage.

3. The energy storage system of claim 1, wherein the energy storage management system is configured to:

receive, from the elevator controller, a command to start charging of the energy storage; and send a command to the charging arrangement to start charging of the energy storage.

4. The energy storage system of claim 1, wherein the energy storage management system is configured to:

receive, from the elevator controller, a command to stop charging of the energy storage; and send a command to the charging arrangement to stop charging of the energy storage.

5. The energy storage system of claim 1, wherein the energy storage management system is configured to:

receive a full charging command from the elevator controller; and perform a maintenance charging of the energy storage to balance the energy storage.

6. The energy storage system of claim 1, wherein the energy storage management system is configured to:

receive an out-of-service signal from the elevator controller; and disable the charging of the energy storage.

7. The energy storage system of claim 1, wherein the energy storage management system is configured to:

generate a warning signal in response to the monitoring the state of the energy storage; and send the warning signal to the elevator controller.

8. The energy storage system of claim 7, wherein the energy storage management system is configured to:

determine that a charge level of the energy storage is below a first threshold; and generate the warning signal in response to determining that the charge level is below the first threshold.

9. The energy storage system of claim 1, wherein the energy storage management system is configured to:

generate a fault signal in response to the monitoring the state of the energy storage; and send the fault signal to the elevator controller.

10. The energy storage system of claim 9, wherein the energy storage management system is configured to:

determine that a charge level of the energy storage is below a second threshold; and generate the fault signal in response to determining that the charge level is below the second threshold.

11. The energy storage system of claim 1, wherein the energy storage management system is configured to send targeted current and/or voltage levels for the charging arrangement via the first communication channel.

12. The energy storage system of claim 1, wherein the first communication channel is a first wireless communication channel and the second communication channel is a second wireless communication channel.

13. A method for monitoring an energy storage system of an elevator car, wherein an energy storage of the elevator car is mounted to the elevator car, the method comprising:

receiving, from an energy storage management system that is mounted to the elevator car and configured to monitor a state of the energy storage of the elevator car, a signal indicating a state associated with the energy storage system;

determining an operating state of the elevator car;

determining an action for the elevator car based on the state associated with the energy storage system and the operating state of the elevator car; and controlling the elevator car to perform the action, wherein the action comprises one of the following:

make an immediate emergency stop;

drive to the nearest floor and stop there;

drive to a charging floor and stop there;

serve the present active call and stop at the charging floor;

serve all existing calls and stop at the charging floor;

continue a normal operation until next maintenance.

14. The method of claim 13, further comprising:

receiving, from the energy storage management system, a signal indicating that charging of the energy storage is disabled and charging contacts are de-energized; and closing a safety circuit associated with the elevator car.

15. The method of claim 13, further comprising:

receiving, from the energy storage management system, a signal indicating that charging of the energy storage is enabled and charging contacts are energized; and opening a safety circuit associated with the elevator car.

16. The method of claim 13, wherein determining an action for the elevator car based on the state associated with the energy storage system and the operating state of the elevator car comprises:

determining, based a data structure comprising different elevator car operation state variables and states of the energy storage, the action for the elevator car.

17. An elevator comprising:

an elevator car;

an elevator controller associated with the elevator car; and an energy storage system of claim 1 for the elevator car.

18. An apparatus for monitoring an energy storage system of an elevator car, wherein an energy storage of the elevator car is mounted to the elevator car, the apparatus comprising:

means for receiving, from an energy storage management system that is mounted to the elevator car and configured to monitor a state of the energy storage of the elevator car, a signal indicating a state associated with the energy storage system;

means for determining an operating state of the elevator car;

means for determining an action for the elevator car based on the state associated with the energy storage system and the operating state of the elevator car; and means for controlling the elevator car to perform the action, wherein the action comprises one of the following:

make an immediate emergency stop;

drive to the nearest floor and stop there;

drive to a charging floor and stop there;

serve the present active call and stop at the charging floor;

serve all existing calls and stop at the charging floor;

continue a normal operation until next maintenance.

19. A computer program comprising program code, which when executed by at least one processor, causes the at least one processor to perform the method of claim 13.

20. A computer readable medium comprising program code, which when executed by at least one processor, causes the at least one processor to perform the method of claim 13.

* * * * *